(12) United States Patent
Ho (10) Patent No.: US 10,144,623 B2
(45) Date of Patent: Dec. 4, 2018

(54) BRAKE FAILURE IN VARIABLE FREQUENCY DRIVE MOTORS

(71) Applicant: Ace World Companies Ltd., Fort Worth, TX (US)

(72) Inventor: Yuh-Jing Ho, Fort Worth, TX (US)

(73) Assignee: ACE WORLD COMPANIES, LTD., Fort Worth, TX (US)

( * ) Notice: Subject to any disclaimer, the term of this patent is extended or adjusted under 35 U.S.C. 154(b) by 316 days.

(21) Appl. No.: 15/216,103

(22) Filed: Jul. 21, 2016

(65) Prior Publication Data

US 2018/0022588 A1    Jan. 25, 2018

(51) Int. Cl.
| | |
|---|---|
| *B66D 1/48* | (2006.01) |
| *H02P 3/04* | (2006.01) |
| *B66D 1/12* | (2006.01) |
| *B66D 1/54* | (2006.01) |

(52) U.S. Cl.
CPC ............... *B66D 1/485* (2013.01); *B66D 1/12* (2013.01); *B66D 1/54* (2013.01); *H02P 3/04* (2013.01); *B66D 2700/0141* (2013.01)

(58) Field of Classification Search
CPC ............ B66D 1/485; B66D 1/12; B66D 1/54; B66D 2700/0141; H02P 3/04
See application file for complete search history.

(56) References Cited

U.S. PATENT DOCUMENTS

| | | | | | |
|---|---|---|---|---|---|
| 5,049,793 | A | * | 9/1991 | Tanaka | H02P 3/04 318/436 |
| 5,296,791 | A | * | 3/1994 | Hipp | B66B 1/30 318/563 |
| 5,343,134 | A | * | 8/1994 | Wendt | G01L 5/284 318/362 |
| 5,692,733 | A | * | 12/1997 | Hiramatsu | B66C 13/23 254/274 |
| 6,097,165 | A | * | 8/2000 | Herron | B66B 1/32 188/162 |
| 7,148,652 | B2 | * | 12/2006 | Ghanemi | B66B 5/02 318/805 |
| 9,448,271 | B2 | * | 9/2016 | Yan | G01R 31/024 |
| 2018/0142662 | A1 | * | 5/2018 | Dal | H02P 21/34 |

* cited by examiner

*Primary Examiner* — Michael E Gallion
(74) *Attorney, Agent, or Firm* — Conley Rose, P.C.

(57) ABSTRACT

A variable frequency drive motor system includes a variable frequency drive motor and a controller coupled to the motor. The controller includes a rectifier, a direct current (DC) link bus, and an inverter. The controller is configured to determine that a brake has failed. In response to the determination that the brake has failed, the controller is configured to determine that power to the controller from a power supply has been interrupted. In response to the determination that power to the controller has been interrupted and a determination that a DC voltage across the DC link bus is below a first threshold value, the controller is configured to drive the motor at a faster speed.

20 Claims, 4 Drawing Sheets

BRAKE FAILURE IN VARIABLE FREQUENCY DRIVE MOTORS

BACKGROUND

Variable frequency driven motors are utilized for a variety of lifting mechanisms, from overhead cranes and hoists to elevators. Typically, when a load supported by a variable frequency driven motor is to be held in suspension for a significant period of time, an external brake is set and the motor is disengaged from supporting the load. Thus, power is not required to be utilized by the motor to support the load reducing power requirements. Additionally, because the motor is disengaged, the motor is saved from unnecessary wear. However, when a brake is employed to hold a load in suspension, various events may result in release of the load, including brake failure and inadvertent release of the load. The brake may fail as a result of a broken spring, a failed brake shoe, or some other mechanical failure. Inadvertent release of the load may result from accidental closing of contacts during maintenance. In any case, the effect of dropping the load may be disastrous.

SUMMARY

The problems noted above are solved in large part by systems and methods for handling a brake failure in a variable frequency drive system maintaining a load. In some embodiments, a variable frequency drive motor system includes a variable frequency drive motor and a variable frequency driver coupled to the motor. The variable frequency driver includes a controller, a rectifier, a direct current (DC) link bus, and an inverter. The controller is configured to determine that a brake has failed. In response to the determination that the brake has failed, the controller is configured to determine that power to the controller from a power supply has been interrupted. In response to the determination that power to the controller has been interrupted and a determination that a DC voltage across the DC link bus is below a first threshold value, the controller is configured to drive the motor at a faster speed.

Another illustrative embodiment is a method for handling a brake failure in a variable frequency drive system maintaining a load. The method may include determining, by a controller of the variable frequency drive system, that a brake has failed while the motor of the variable frequency drive system is stopped. The method may also include, in response to the determination that the brake has failed, determining that power to the controller from a power supply has been interrupted. The method also may include, in response to the determination that power to the controller from the power supply has been interrupted, determining that a DC voltage across a DC link bus in the controller is below a first threshold value. The method may also include, in response to the determination that the DC voltage across the DC link bus in the controller is below the first threshold value, driving the motor at a faster speed.

Yet another illustrative embodiment is a crane system that includes a variable frequency drive motor system and a winding drum. The variable frequency drive motor system may include a controller coupled to a variable frequency drive motor. The winding drum may be coupled to the motor. The motor is configured to drive the winding drum to rotate such that a load is capable of rising and lowering. The controller is configured to determine that a brake coupled to the motor has failed, determine that power to the controller from a power supply has been interrupted, and in response to a determination that a DC voltage across a DC link bus in the controller is below a first threshold value, drive the motor at a faster speed.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Variable frequency drive motors are utilized to drive motors in a variety of lifting contexts (e.g., cranes and elevators). When a load supported by a variable frequency driven motor is to be held in suspension for a significant period of time, an external brake is set and the motor is disengaged from supporting the load. However, when a brake is employed to hold a load in suspension, various events may result in release of the load, including brake failure which may have catastrophic consequences (e.g., the load may fall on a person). Therefore, it is desirable to provide systems and methods for preventing a load elevated by a variable frequency driven motor and supported by a brake from dropping in the event of brake failure.

In accordance with the disclosed principles, various systems and methods may be implemented to control an elevated load in the event of a brake failure. If the brake has failed, but power to the variable frequency driver is not interrupted, a servo lock mode may be implemented on the motor allowing the load to be controlled while the motor is operating with a zero servo value. However, if the brake has failed and power from an external power supply has been interrupted to the variable frequency driver, an auto hoist lower algorithm is implemented, so long as the variable frequency driver is still operable. In the auto hoist lower algorithm, the variable frequency driver is configured to drive the motor at a higher speed if the voltage in the variable frequency driver drops below a lower threshold level lowering the elevated load at a higher rate. Due to feedback, this increases the voltage in the variable frequency driver preventing it from failing. The variable frequency driver is further configured to drive the motor at a slower speed if the voltage in the variable frequency driver is greater than a higher threshold level lowering the elevated load at a slower rate. Due to feedback, this decreases the voltage in the variable frequency driver preventing it from failing due to too much voltage. If the brake has failed, power from an external power source to the variable frequency driver has been interrupted, and the variable frequency driver is inoperable, then a contactor may provide a switch such that the motor is directly connected to a resistive load and not the variable frequency driver. The resistive load generates torque to hold the elevated load and keep the load from lowering quickly or free falling. Instead the elevated load lowers in a controlled manner. In this way, an elevated load may be safely lowered in a controlled manner in the event of a brake failure.

Figure 1:
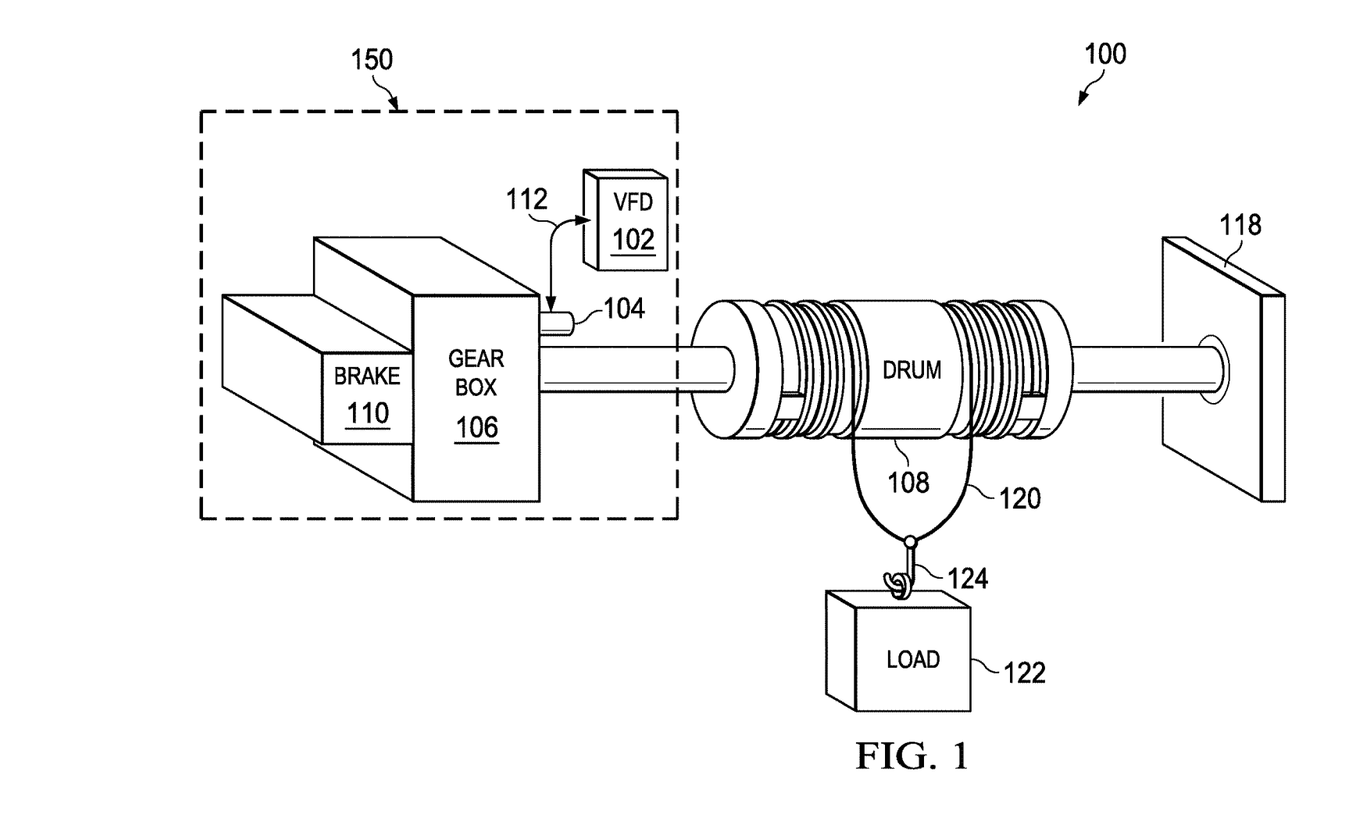
FIG. 1 shows a block diagram of an illustrative crane system, in accordance with various embodiments.

FIG. 1 shows a block diagram of illustrative crane system 100, in accordance with various embodiments. Crane system 100 may include variable frequency drive system 150, winding drum 108, frame 118, wire rope 120, hook 124, and load 122. Variable frequency drive system 150 is configured to control the operation of drum 108 to enable the lifting and lowering of load 122. For example, variable frequency drive system 150 may be configured to turn a shaft, utilizing motor 104 and gearbox 106, which in turn rotates the drum 108 to either wind the wire rope 120 up causing the load 122, which may be attached to wire rope 120 via hook 124, to lift or to release more wire rope 120 causing the load 122 to lower. In some embodiments, frame 118, along with the gearbox 106 of the variable drive system 150, acts to support the drum 108, the wire rope 120, hook 124, and load 122.

The variable frequency drive system 150 may include variable frequency driver 102, motor 104, gearbox 106, load brake 110, and power cable 112. The variable frequency driver 102 is configured to drive motor 104. More particularly, motor 104 may receive power from variable frequency driver 102, which may be connected to an external power source, via power cable 112. In some embodiments, variable frequency driver 102 is a flux vector technology driver employing a mathematical model followed by the drive in controlling the operation of motor 104. In alternative embodiments, variable frequency driver 102 is an open loop vector drive employing a mathematical model followed by the drive in controlling the operation of motor 104. The motor, which may be an induction motor and/or a permanent magnet motor, is configured to convert electrical and/or magnetic energy into mechanical energy. In other embodiments, the motor may be any type of electrical motor including a brushed direct current (DC) motor, a brushless DC motor, a switched reluctance motor, and/or any type of alternating current (AC) motor. The motor may receive power from variable frequency driver 102 and convert that energy into rotating a shaft. The rotation of the shaft may drive gears and gear trains in gearbox 106. Gearbox 106, which may be any type of gearbox, may provide speed and torque conversions to control the rotation of drum 108. For example, gearbox 106 may provide gear reduction to rotate a shaft connected to drum 108. The rotation of this shaft, may cause the drum 108 to rotate, which in turn causes the winding and/or unwinding of wire rope 120. In this way, load 122 may be lifted and/or lowered. In some embodiments, the gear box may include load brake 110 which may be configured to retard loads from falling when zero torque is applied by motor 104.

Figure 2:
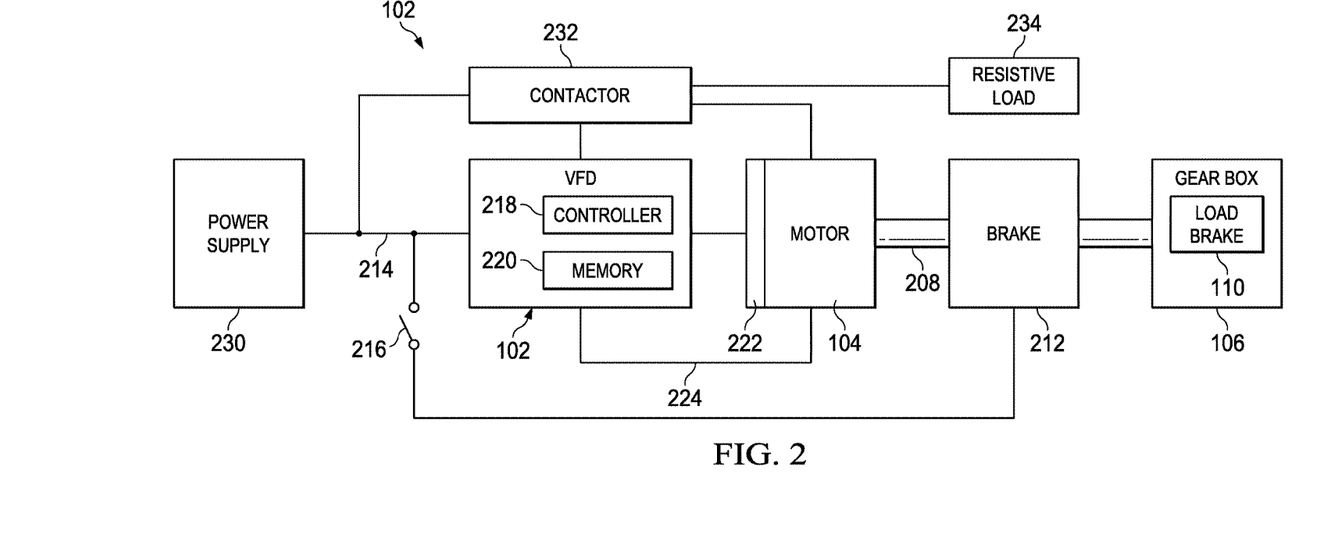
FIG. 2 shows a block diagram of an illustrative variable frequency drive system, in accordance with various embodiments.

FIG. 2, shows an illustrative block diagram of variable frequency drive system 150, in accordance with various embodiments. As discussed above, the variable frequency drive system 150 may include variable frequency driver 102, motor 104 connected to gearbox 106 via a common shaft 208. Shaft 208 may be a multi-segment or unitary shaft. Selectively operable on shaft 208 is an electromechanical brake 212 which may support loads when motor 104 is stopped and/or applying zero torque. Brake 212 is electrically connected to an input 214 from an external power supply 230 via switch 216 which, when closed, actuates brake 212. When actuated, brake 212 stops the shaft 208 from rotating, thus preventing any rotation of drum 108. External power supply 230 may be any power supply that provides power to the variable frequency drive system 150. Switch 216 may be controlled by the variable frequency driver 102.

As discussed above, motor 104 receives power from variable frequency driver 102, which is also connected to input 214 from the external power supply 230. Variable frequency driver 102 may include a controller 218 configured to control the operations of variable frequency driver 102 and memory 220 which is selectively programmable to store instructions that controller 218 may access and execute to control operation of variable frequency driver 102. Controller 218 may be any type of controller including a microcontroller, a system on a chip (SoC), an expansion card, or a stand-alone device that interfaces with memory 220. Memory 220 may be a semiconductor random access memory (RAM), such as static RAM (SRAM), or other volatile memory suitable for use in the variable frequency driver 102. The memory 220 may also be a FLASH memory, electrically erasable programmable read-only memory (EEPROM), ferroelectric RAM (FRAM), or other non-volatile memory suitable for use in the variable frequency driver 102. Variable frequency driver 102 may receive feedback from pulse generator 222 (also sometimes called a "motor encoder" or "motor position encoder") attached to or forming a part of motor 104. In some embodiments, pulse generator 222 is a 1024 pulse-per-revolution (ppr) pulse generator. Feedback from pulse generator 222 allows variable frequency driver 102 to operate rotor 104 in zero servo (or "load float") mode, in which motor 104 applies torque to a load at zero speed.

Contactor 232 may also be coupled to variable frequency driver 102 and motor 104. Contactor 232 is configured to electrically control switching in the variable frequency drive system 150. For instance, as discussed above, variable frequency driver 102 is configured to drive motor 104; however, contactor 232 may provide a switch such that variable frequency driver 102 is not directly connected to motor 104. Instead, resistive load 234 is directly connected to motor 104, thereby generating torque on motor 104 in certain situations in which brake 212 fails as discussed below. Resistive load 234 may be any type of resistive load and/or loads that convert current into forms of energy, such as heat. In some embodiments, resistive load 234 contains no inductance or capacitance, only pure resistance and may be a three phase resistive load.

Figure 3:
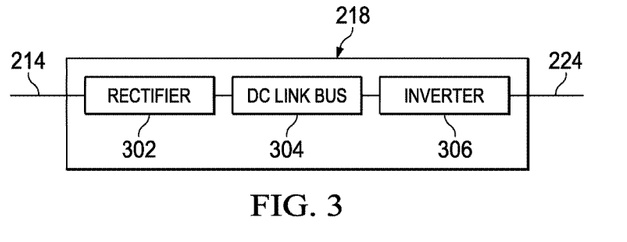
FIG. 3 shows a block diagram of an illustrative variable frequency driver of a variable frequency drive system, in accordance with various embodiments.

FIG. 3 shows a block diagram of an illustrative variable frequency driver 102 of variable frequency drive system 150, in accordance with various embodiments. In addition to the controller 218 and memory 220 shown in FIG. 2, the variable frequency driver 102 may comprise a rectifier 302, a DC link bus 304, and an inverter 306. Rectifier 302 may be a circuit configured to receive AC line voltage from power source 230 and convert the AC line voltage into a DC voltage. In some embodiments, the rectifier 302 comprises a plurality of diodes, mercury-arc valves, silicon-controlled rectifiers (SCRs), insulated gate bipolar transistors (IGBTs) connected in a full-wave bridge configuration, and/or other silicon-based semiconductor switches. Once the AC line voltage has been converted to a DC voltage, DC bus link 304 is configured to store, in some embodiments in one or more capacitors, the DC voltage in order to smooth the DC ripple that may be in the DC voltage provided by rectifier 302, in some embodiments, as a series of DC pulses. Inverter 306 is a circuit configured to receive the smoothed DC voltage provided by the DC bus link 304 and convert the signal into an AC voltage. In some embodiments, inverter 306 comprises a plurality of IGBTs that create the sinusoidal AC voltage utilizing the pulsed DC bus link 304 voltage. This is sometimes referred to as pulse width modulation (PWM) to drive motor 104.

Figure 4:
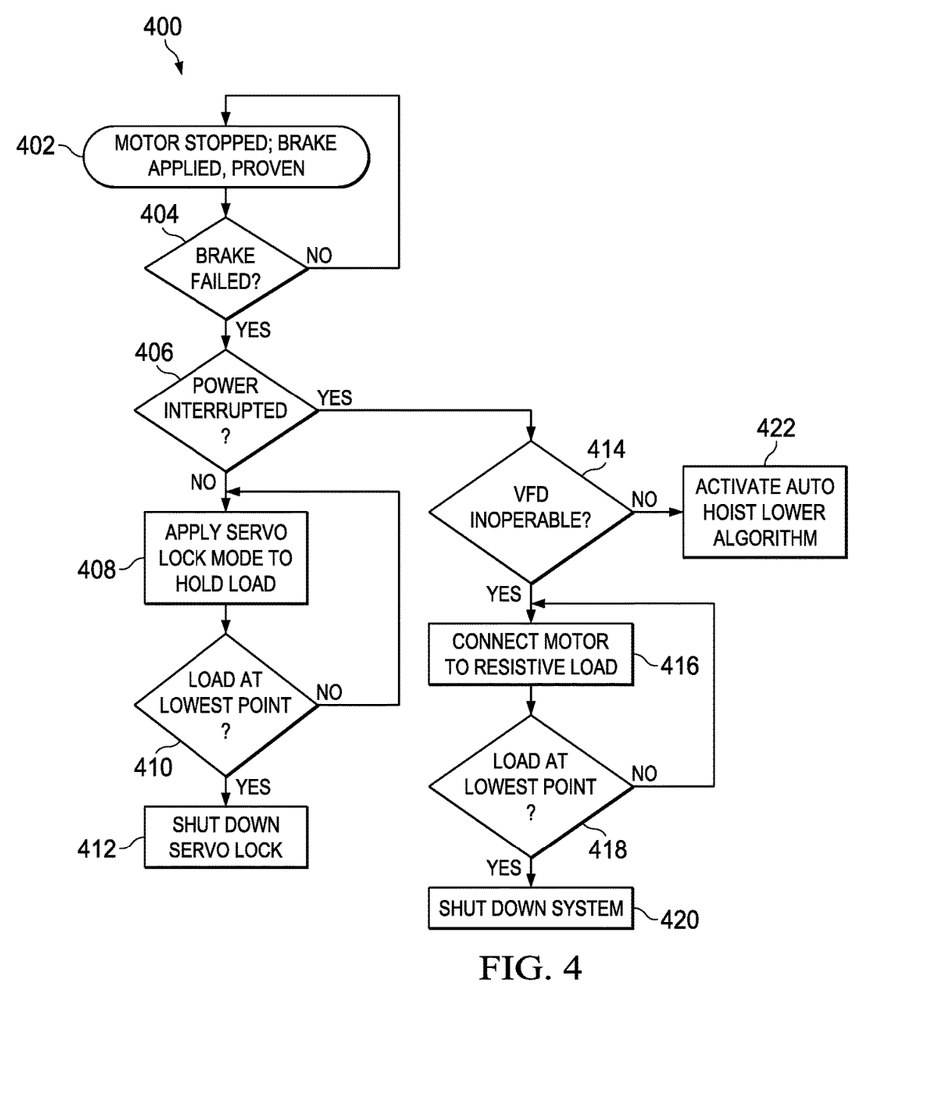
FIG. 4 shows a flow diagram illustrating aspects of operations that may be performed to handle a brake failure in a variable frequency drive system maintaining a load, in accordance with various embodiments.
Figures 5, 6:
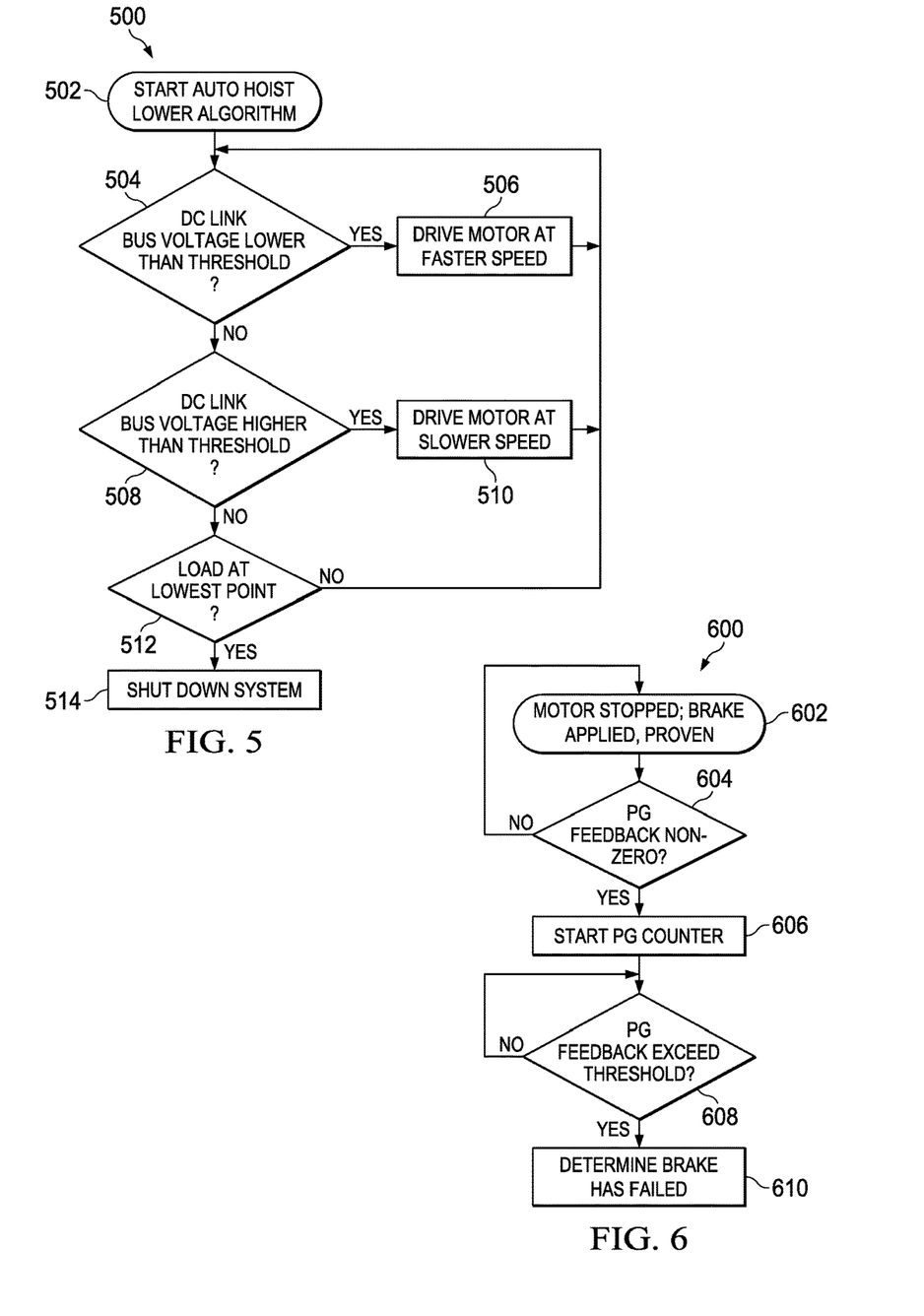
FIG. 5 shows a flow diagram illustrating aspects of operations that may be performed to run an auto hoist lower algorithm, in accordance with various embodiments.
FIG. 6 shows a flow diagram illustrating aspects of operations that may be performed to determine that a brake of a variable frequency drive system has failed, in accordance with various embodiments.

FIG. 4 is an illustrative flow diagram of a method 400 that may be performed to handle a brake 212 failure in a variable frequency drive system 150 maintaining a load 122, in accordance with various embodiments. FIG. 5 is an illustrative flow diagram of a method 500 that may be performed to run an auto hoist lower algorithm, in accordance with various embodiments. FIG. 6 is a flow diagram of a method 600 that may be performed to determine that a brake 212 of a variable frequency drive system 150 has failed, in accordance with various embodiments. Though depicted sequentially as a matter of convenience, at least some of the actions shown in methods 400, 500, and 600 can be performed in a different order and/or performed in parallel. Additionally, some embodiments may perform only some of the actions shown. In some embodiments, at least some of the operations of the methods 400, 500, and 600, as well as other operations described herein, can be performed by variable frequency driver 102 (including controller 218), frequency pulse generator 222, motor 104, brake 212, gearbox 106, contactor 232, and resistive load 234, and implemented in logic and/or by a processor executing instructions stored in a non-transitory computer readable storage medium (e.g., memory 220).

FIG. 4 shows a flow diagram illustrating aspects of operations that may be performed to handle a brake 212 failure in a variable frequency drive system 150 maintaining a load 122, in accordance with various embodiments. The method begins in block 402 which depicts the motor being stopped, which, in some embodiments means that motor is run at zero speed for at least one second, and the electromechanical brake applied and proven. At this point, power to the motor is typically discontinued. In block 404, a determination is made as to whether a brake has failed. For example, controller 218 may determine whether brake 212 has failed. In an embodiment, controller 218 may, instead of performing the operations shown in method 600 of FIG. 6, may monitor the voltage across the DC bus link 304 while the motor 104 is in a stopped condition. If the controller 218 determines that the voltage across DC bus link 304 has increased above a brake failure voltage threshold value which may be preselected and/or predetermined, the controller 218 may determine that the brake 212 has failed. In alternative embodiments, such as shown in FIG. 6 below, controller 218 may determine that the brake 212 has failed utilizing other detection methods. If in block 404, a determination is made that the brake has not failed, the method continues in block 402 because conditions are deemed satisfactory.

However, if, in block 404, a determination is made that the brake has failed, the method 400 continues in block 406 with a determination of whether power has been interrupted to the variable frequency driver 102. In some embodiments, controller 218 may monitor to determine whether it is receiving power to make the determination. If, in block 406, a determination is made that power to the variable frequency driver 102 has not been interrupted, the method 400 continues in block 408 with applying a servo lock mode to hold the load. For example, the zero servo value of the motor 104 position is applied and the brake 212 may be released. Thus, the motor 104 is independently holding load 122. An operator may then take control of the device in which the motor 104 and variable frequency driver 102 are utilized to safely lower the load. The method 400 continues in block 410 with determining whether the load is at its lowest point. For example, a determination is made as to whether the load 122 has been lowered to the ground. If, in block 410, a determination is made that the load is not at its lowest point, the method 400 continues in block 408 with continuing to apply the servo lock mode (i.e., the motor 104 in the zero servo mode). However, if, in block 410, a determination is made that the load is at its lowest point (e.g., load 122 has lowered all the way to the ground), the method 400 continues in block 412 with shutting down the servo lock.

If, in block 406, a determination is made that power to the variable frequency driver 102 has been interrupted, the method 400 continues in block 414 with determining whether the variable frequency driver 102 is inoperable. If, in block 414, a determination is made that the variable frequency driver is inoperable, the method 400 continues in block 416 with connecting the motor 104 to the resistive load 234. For example, contactor 232 may switch the motor such that it is connected directly to resistive load 234 instead of variable frequency driver 102. Because the break 212 has failed, the load 122 will begin to lower. However, the resistive load 234 generates torque to hold the load 122 and keep the load 122 from lowering quickly or free falling. Instead, the load 122 will lower in a slow, controlled manner even without any control being provided by variable frequency driver 102. In block 418, the method 400 continues with determining whether the load is at its lowest point. For example, a determination is made as to whether the load 122 has been lowered to the ground. If, in block 418, a determination is made that the load is not at its lowest point, the method 400 continues in block 416 with continuing to connect the resistive load 122 to the motor. However, if, in block 418, a determination is made that the load is at its lowest point (e.g., load 122 has lowered all the way to the ground), the method 400 continues in block 420 with shutting down the frequency drive system 150.

If, in block 414, a determination is made that the variable frequency driver 102 is not inoperable (i.e., is operable), then the method 400 continues in block 422 with activating an auto hoist lower algorithm as shown in FIG. 5. In other words, if the variable frequency driver 102 is operable even though power has been interrupted, the auto lower algorithm discussed in FIG. 5 is implemented.

FIG. 5 shows a flow diagram illustrating aspects of operations that may be performed to run an auto hoist lower algorithm, in accordance with various embodiments. The method 500 begins in block 502 with starting the auto hoist lower algorithm. For example, if, as discussed above, the variable frequency driver 102 is operable and power to the variable frequency driver 102 has been interrupted, the auto lower algorithm is started. In block 504, the method 500 continues with determining whether the voltage across the DC link bus 304 is lower (less than) than a first threshold value (which in some embodiments is predetermined and/or preconfigured in controller 218). In some embodiments, the first threshold value is 300V. In an example, the controller 218 may compare the voltage across the DC link bus 304 to the first threshold value to determine whether the voltage is lower than that threshold. If, in block 504, a determination is made that the voltage across the DC link bus 304 is lower than the first threshold value, the method continues in block 506 with driving motor 104 at a faster speed. Because of the feedback involved in variable frequency drive system 150, the speed at which the motor is driven controls the amount of power being provided to the variable frequency driver 102 (in situations where power from power supply 230 has been interrupted). Therefore, driving the motor 104 at a faster speed than it is currently being driven will increase the power being received by the variable frequency driver 102. Thus, because the voltage in the voltage frequency driver 102 is less than the first threshold value (deemed too low), the increase in speed of the motor will feedback to the voltage frequency driver 102 as an increase in voltage preventing the voltage frequency driver 102 from shutting down and becoming inoperable due to a lack of power. The method 500 continues in block 504 with once again determining whether the voltage across DC link bus 304 is below the first threshold value.

If, in block 504 a determination is made that the voltage across DC link bus 304 is not lower than the first threshold value (i.e., is higher than the first threshold value), the method 500 continues in block 508 with determining whether the voltage across DC link bus 304 is higher than (exceeds) a second threshold value that is higher than the first threshold value (which in some embodiments is predetermined and/or preconfigured in controller 218). In some embodiments, the second threshold value is 700V. For example, the controller 218 may compare the voltage across the DC link bus 304 to the second, higher, threshold value to determine whether the voltage is higher than that threshold. If, in block 508, a determination is made that the voltage across the DC link bus 304 is higher than the second threshold value, the method 500 continues in block 510 with driving motor 104 at a slower speed. Because of the feedback involved in variable frequency drive system 150, the speed at which the motor is driven controls the amount of power being provided to the variable frequency driver 102 (in situations where power from power supply 230 has been interrupted). Therefore, driving the motor 104 at a slower speed than it is currently being driven will decrease the power being received by the variable frequency driver 102. Thus, because the voltage in the voltage frequency driver 102 is greater than the second threshold value (deemed too high), the decrease in speed of the motor will feedback to the voltage frequency driver 102 as a decrease in voltage preventing the voltage frequency driver 102 from receiving too much voltage and being damaged. The method 500 continues in block 504 with once again determining whether the voltage across DC link bus 304 is below the first threshold value.

If, in block 508, a determination is made that the voltage across the DC link bus 304 is not higher than the second threshold value (i.e., the voltage is between the first threshold value (e.g., 300V) and the second threshold value (e.g., 700V)), the method 500 continues in block 512 with determining whether the load is at its lowest point. For example, a determination is made as to whether the load 122 has been lowered to the ground. If, in block 512, a determination is made that the load is not at its lowest point, the method 500 continues in block 504 with continuing to monitor whether the voltage across the DC link bus 304 is lower than the first threshold value. However, if, in block 512, a determination is made that the load is at its lowest point (e.g., load 122 has lowered all the way to the ground), the method 500 continues in block 514 with shutting down the frequency drive system 150. In this way, the variable frequency driver 102 may maintain power to safely lower load 122 to the ground after power from power source 230 has been interrupted.

FIG. 6 shows a flow diagram illustrating aspects of operations that may be performed to determine that a brake of a variable frequency drive system has failed, in accordance with various embodiments. The method 600 begins in block 602 which depicts the motor being stopped and/or not powered by the variable frequency driver 102, which, in some embodiments means that motor is run at zero speed for at least one second, and the electromechanical brake applied and proven. At this point, power to the motor is typically discontinued. In block 604, the method 600 continues with determining whether a pulse generator feedback signal is non-zero. For example, controller 218 may monitor the generated feedback signal from pulse generator 222 (i.e., the pulse generated feedback signal) while motor 104 is stopped (i.e., not rotating shaft 208) to determine if there are any pulse generator feedback signals being received by the controller 218. If in block 604, a determination is made that the pulse generator feedback signal is not non-zero (i.e., is zero), the method 600 continues in block 602 because conditions are deemed satisfactory.

However, if in block 604, a determination is made that the pulse generator feedback signal is non-zero (indicating that the motor 104 is rotating shaft 208), the method 600 continues in block 606 with starting a pulse generator counter. The pulse generator counter, which may be included within controller 218 stores a measurement of the pulse generated feedback from the pulse generator 222. The method 600 continues in block 608 with determining whether the pulse generated feedback exceeds a brake failure threshold value. For example, controller 218 may compare the pulse generated feedback signal count stored to a brake failure threshold value which may be preselected and/or predetermined. In other words, the pulse generator 222 will generate pulses indicative of rotation of shaft 208. Therefore, if the pulse generated feedback signal includes a number of pulses, the shaft 208 is rotating and brake 212 is beginning to fail. After a threshold number of pulses are received (i.e., the pulse generator feedback signal exceeds the brake failure threshold value), the controller 218 determines that the pulse generator feedback has exceeded the brake failure threshold value. If in block 608, a determination is made that the pulse generator feedback has not exceeded the brake failure threshold value, the method 600 continues in block 608. Thus, the method 600 continues in this loop unless a determination is made that the pulse generator feedback has exceed the brake failure threshold value or until the motor 104 is started. If in block 608 a determination is made that the pulse generator feedback has exceeded the brake failure threshold value, the method 600 continues in block 610 with determining that the brake has failed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A variable frequency drive motor system, comprising:
   a variable frequency drive motor; and
   a variable frequency driver coupled to the motor, the variable frequency driver including a controller, a rectifier, a direct current (DC) link bus, and an inverter, the controller configured to:
   determine that a brake has failed;
   in response to the determination that the brake has failed, determine that power to the controller from a power supply has been interrupted; and
   in response to the determination that power to the controller has been interrupted and a determination that a DC voltage across the DC link bus is below a first threshold value, driving the motor causing the motor to drive at a faster speed.

2. The system of claim 1, wherein the controller is further configured to, in response to the determination that power to the controller has been interrupted and a determination that the DC voltage across the DC link bus is above a second threshold value, driving the motor at a slower speed.

3. The system of claim 1, wherein the controller is further configured to:
   determine that a load driven by the motor has lowered to a lowest point; and
   in response to the determination that the load has lowered to the lowest point, shut down the variable frequency drive motor system.

4. The system of claim 1, further comprising a pulse generator coupled to the motor and the controller, the pulse generator configured to generate a pulse generator feedback signal corresponding to movement of the motor.

5. The system of claim 4, wherein the controller is configured to determine that the brake has failed by:
   monitoring the pulse generator feedback signal while the motor is not powered by the variable frequency driver;
   comparing the pulse generator feedback signal to a brake failure threshold value indicative of brake failure; and
   determining that the pulse generator feedback signal exceeds the brake failure threshold value.

6. The system of claim 1, wherein the motor is an induction motor.

7. The system of claim 1, wherein the controller is further configured to:
   in response to the determination that the brake has failed, determine that power to the controller is being received from the power supply; and
   in response to the determination that power to the controller is being received from the power supply, actuate the motor in zero servo mode.

8. A method of handling a brake failure in a variable frequency drive system maintaining a load, comprising:
   determining, by a controller of the variable frequency drive system, that a brake has failed while a motor of the variable frequency drive system is stopped;
   in response to the determination that the brake has failed, determining that power to the controller from a power supply has been interrupted;
   in response to the determination that power to the controller from the power supply has been interrupted, determining that a direct current (DC) voltage across a DC link bus in the controller is below a first threshold value; and
   in response to the determination that the DC voltage across the DC link bus in the controller is below the first threshold value, driving the motor at a faster speed.

9. The method of claim 8, further comprising:
   in response to the determination that power to the controller from the power supply has been interrupted, determining that the DC voltage across the DC link bus in the controller is above a second threshold value; and
   in response to the determination that the DC voltage across the DC link bus in the controller is above the second threshold value, driving the motor at a slower speed.

10. The method of claim 9, further comprising:
    determining that the load has lowered to a lowest point; and
    in response to the determination that the load has lowered to the lowest point, shutting down the variable frequency drive system.

11. The method of claim 8, further comprising:
    determining that the controller is inoperable; and
    in response to a determination that the controller is inoperable, connecting the motor to a resistive load.

12. The method of claim 11, wherein the motor is a permanent magnet motor.

13. The method of claim 11, wherein, the resistive load is a three phase resistive load.

14. The method of claim 8, wherein the determining that the brake has failed comprises:
    generating, by a pulse generator, a feedback signal corresponding to movement of the motor;
    monitoring the pulse generator feedback signal while the motor is stopped;
    comparing the pulse generator feedback signal to a brake failure threshold value indicative of brake failure; and
    determining that the pulse generator feedback signal exceeds the brake failure threshold value.

15. A crane system, comprising:
    a variable frequency drive motor system including a controller coupled to a variable frequency drive motor;
    a winding drum coupled to the motor, the motor configured to drive the winding drum to rotate such that a load is capable of rising and lowering;
    wherein, the controller is configured to:
    determine that a brake coupled to the motor has failed;
    determine that power to the controller from a power supply has been interrupted; and
    in response to a determination that a direct current (DC) voltage across a DC link bus in the controller is below a first threshold value, driving the motor at a faster speed.

16. The system of claim 15, wherein the controller is further configured to, in response to a determination that the DC voltage across the DC link bus is above a second threshold value, driving the motor at a slower speed.

17. The system of claim 16, wherein driving the motor at a faster speed lowers the load at a faster rate and driving the motor at a slower speed lowers the load at a slower rate.

18. The system of claim 17, wherein the controller is further configured to:
   determine that the load has lowered to a lowest point; and
   in response to the determination that the load has lowered to the lowest point, shut down the variable frequency drive motor system.

19. The system of claim 15, wherein the further variable frequency drive motor system includes a pulse generator coupled to the motor and the controller, the pulse generator configured to generate a pulse generator feedback signal corresponding to movement of the motor.

20. The system of claim 19, wherein the controller is configured to determine that the brake has failed by:
   monitoring the pulse generator feedback signal while the motor is stopped;
   comparing the pulse generator feedback signal to a brake failure threshold value indicative of brake failure; and
   determining that the pulse generator feedback signal exceeds the brake failure threshold value.

* * * * *